United States Patent
Wheeler et al.

(10) Patent No.: US 9,857,801 B2
(45) Date of Patent: Jan. 2, 2018

(54) SYSTEM AND METHOD FOR DETECTING A STICK-SLIP

(71) Applicant: General Electric Company, Schenectady, NY (US)

(72) Inventors: Frederick Wilson Wheeler, Niskayuna, NY (US); Robert Claude Prescott, Marshfield, MA (US); Justin Shriver, Newton, MA (US); Larry Schoonover, Falmouth, MA (US)

(73) Assignee: General Electric Company, Niskayuna, NY (US)

( * ) Notice: Subject to any disclaimer, the term of this patent is extended or adjusted under 35 U.S.C. 154(b) by 853 days.

(21) Appl. No.: 14/231,505

(22) Filed: Mar. 31, 2014

(65) Prior Publication Data

US 2015/0277445 A1    Oct. 1, 2015

(51) Int. Cl.
| G05D 7/00 | (2006.01) |
| G05D 7/06 | (2006.01) |
| G05B 15/02 | (2006.01) |
| G05B 23/02 | (2006.01) |

(52) U.S. Cl.
CPC .......... G05D 7/0635 (2013.01); G05B 15/02 (2013.01); G05B 23/0235 (2013.01); *G05B 2219/33326* (2013.01)

(58) Field of Classification Search
None
See application file for complete search history.

(56) References Cited

U.S. PATENT DOCUMENTS

| 5,719,788 A | 2/1998 | Seborg et al. |
| 5,750,879 A | 5/1998 | Ohtsuka et al. |
| 6,497,205 B2 | 12/2002 | Kumaki et al. |
| 6,745,084 B2 | 6/2004 | Boger et al. |
| 6,745,107 B1 * | 6/2004 | Miller ................ F16K 37/0075 700/282 |
| 7,089,086 B2 | 8/2006 | Schoonover |
| 7,478,012 B2 | 1/2009 | Tewes et al. |
| 7,542,876 B2 | 6/2009 | Singhal et al. |
| 7,797,082 B2 | 9/2010 | Srinivasan et al. |
| 8,145,328 B2 | 3/2012 | Choudhury et al. |
| 2008/0004836 A1 * | 1/2008 | Tewes ................ G05B 23/0221 702/182 |

(Continued)

FOREIGN PATENT DOCUMENTS

| EP | 1441266 A2 | 7/2004 |
| EP | 1528447 A1 | 5/2005 |
| JP | 2003036115 A | 2/2003 |

OTHER PUBLICATIONS

Hagglund, "A Control-Loop Performance Monitor", Control Engineering Practice, vol. No. 3, Issue No. 11, pp. 1543-1551, 1995.

(Continued)

*Primary Examiner* — Evral E Bodden
(74) *Attorney, Agent, or Firm* — Nitin N. Joshi

(57) ABSTRACT

A method of performing online diagnostics for a valve includes receiving valve information while the valve is in operation. The valve information includes setpoint data and position data associated with the valve. The method further includes processing the setpoint data and the position data at a plurality of time intervals, and detecting an occurrence of a stick-slip based on the processing.

17 Claims, 5 Drawing Sheets

(56) References Cited

U.S. PATENT DOCUMENTS

| | | | |
|---|---|---|---|
| 2011/0082665 A1 | 4/2011 | Tabaru et al. | |
| 2011/0224949 A1 | 9/2011 | Tabaru et al. | |
| 2013/0124132 A1 | 5/2013 | Kashima | |
| 2015/0032270 A1* | 1/2015 | Gattu | F15B 19/005 700/282 |
| 2015/0277445 A1* | 10/2015 | Wheeler | G05D 7/0635 700/282 |
| 2016/0169410 A1* | 6/2016 | Wheeler | F16K 37/0041 137/1 |

OTHER PUBLICATIONS

Choudhury "Detection and Quantification of Valve Stiction", American Control Conference, pp. 2097-2106, 2006.

PCT Search Report and Written Opinion issued in connection with corresponding Application No. PCT/US2015/046146 dated Nov. 25, 2015.

Hagglund, Tore, A Shape-Analysis Approach for Diagnosis of Stiction in Control Valves, Control Engineering Practice, Science Direct, Aug. 2011, pp. 782-789, vol. 19, Issue 8.

Jelali, Mohieddine, Estimation of Valve Stiction in Control Loops Using Separable Least-Squares and Global Search Algorithms, Journal of Process Control, Science Direct, Aug.-Sep. 2008, pp. 632-642, vol. 18, Issues 7-8.

PCT Search Report and Written Opinion issued in connection with corresponding Application No. PCT/US2015/020663 dated Aug. 31, 2015.

U.S. Appl. No. 14/506,047, filed Oct. 3, 2014, Larry Gene Schoonover.

\* cited by examiner

SYSTEM AND METHOD FOR DETECTING A STICK-SLIP

BACKGROUND

The field of the disclosure relates generally to stick-slip detection, more particularly, to systems and methods for detecting an occurrence of a stick-slip by performing online diagnostics for a valve.

Stick-slip in a control valve refers to an inability to control a position of the valve due to high static friction and low kinetic friction between a valve stem and valve packing. The stick-slip phenomenon occurs when an attempt is made to move a position of the valve to a setpoint. However, when a force is applied to move the valve, the force does not immediately overcome the static friction. Therefore, the force is increased until the static friction is overcome, which results in a sudden jump due to low kinetic friction. Unfortunately, the force required to overcome the static friction forces the valve to overshoot a desired setpoint and, as a result, the valve is stuck at a new undesirable position. This process is repeated in the opposite direction resulting in cycling of the valve back and forth across desired setpoints in an undesirable manner that is not well-controlled. As a result of stick-slip cycling, the valve wears out faster and the process being controlled by the valve is negatively affected. However, if it is known that a control valve is undergoing stick-slip, then adjustments may be made or maintenance performed to correct the problem.

Existing systems detect stick-slip by performing periodic diagnostics on control valves to determine operability and performance of the valves. These existing systems use various sensors and other measurement devices, such as a digital valve controller, to measure and collect data from various sensors on a control valve. However, determining whether a stick-slip has occurred is typically unknown in these existing systems until the collected data is reviewed by an operator who then determines if the collected data demonstrates characteristics of an occurrence of a stick-slip. As a result, existing systems prove to be very inefficient in stick-slip detection as a detection of a stick-slip cannot be achieved very quickly or very reliably if the data is analyzed offline and if characteristics of stick-slip are similar to other system errors. This not only results in inadequate timing of stick-slip detection, but also results in a misdiagnosis of stick-slip detection.

BRIEF DESCRIPTION

In one aspect, a method of performing online diagnostics for a valve is provided. The method includes receiving valve information while the valve is in operation. The valve information includes setpoint data and position data associated with the valve. The method further includes processing the setpoint data and the position data at a plurality of time intervals, and detecting an occurrence of a stick-slip based on the processing.

In a further aspect, a system for performing online diagnostics for a valve is provided. The system includes a process controller generating a plurality of setpoints for operating the valve through a series of gradual movements. They system also includes a positioner component receiving the plurality of setpoints and generating a signal for positioning the valve based on the plurality of setpoints. The system further includes a processor programmed to receive valve information from the positioner component. The valve information includes setpoint data and position data associated with the valve. The processor is further programmed to process the setpoint data and the position data at a plurality of time intervals, and detect an occurrence of a stick-slip based on the comparison.

In another aspect, one or more non-transitory computer-readable media is provided. The one or more non-transitory computer-readable media include computer-executable instructions for performing online diagnostics for a valve. The computer-executable instructions cause at least one processor to receive valve information while the valve is in operation. The valve information includes setpoint data and position data associated with the valve. The computer-executable instructions further cause the at least one processor to process the setpoint data and the position data at a plurality of time intervals, and detect an occurrence of a stick-slip based on the processing.

DRAWINGS

These and other features, aspects, and advantages of the present disclosure will become better understood when the following detailed description is read with reference to the accompanying drawings in which like characters represent like parts throughout the drawings, wherein.

Figure 1:
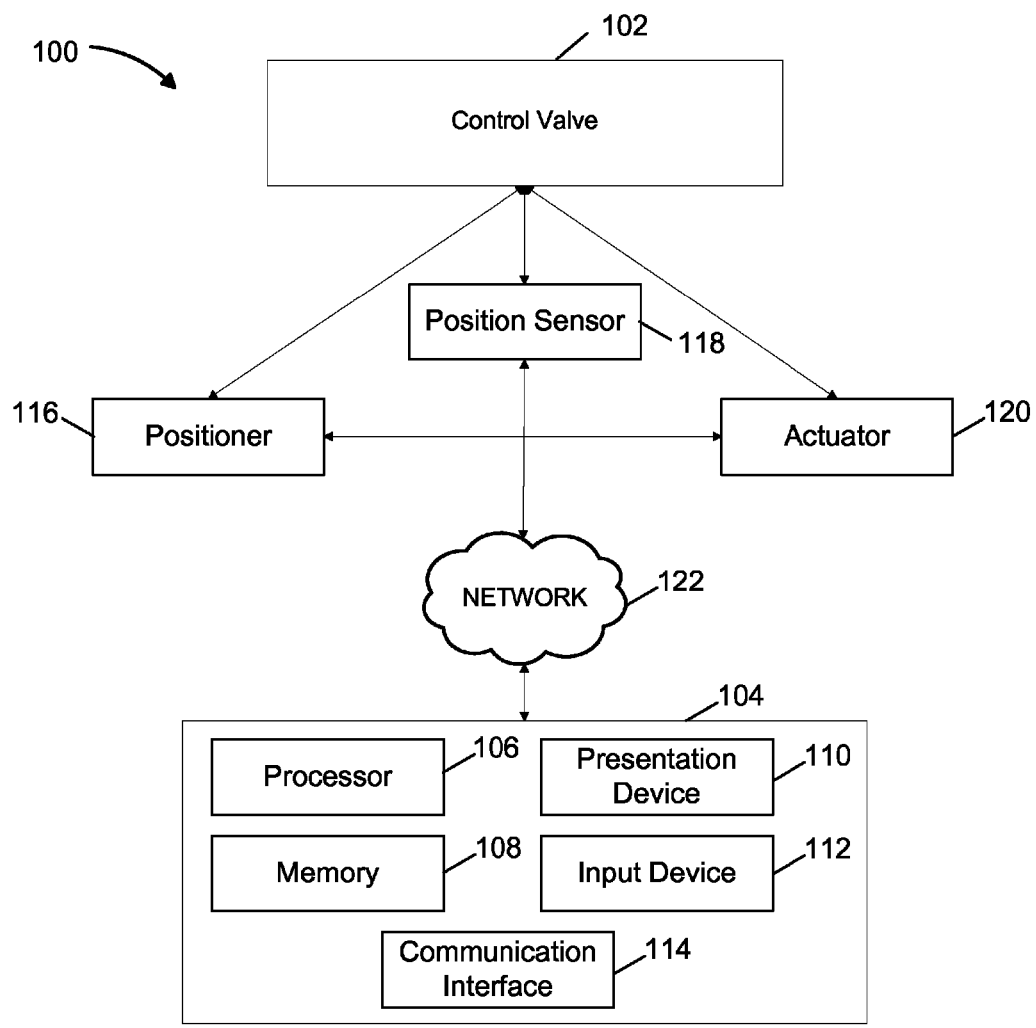
FIG. 1 is an exemplary block diagram of a system for detecting an occurrence of a stick-slip by performing online diagnostics for a valve.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein enable on-line detection of stick-slip cycling in a control valve by using data collected during operation of the control valve (e.g., while the control valve is in operation). For example, during an operation of the control valve, data, such as setpoints of a control valve, positions of the control valve, and even pressure applied to the control valve are collected at a plurality of time intervals over a period of time (e.g., an amount of time it takes to collect a defined number of setpoint, position, and/or pressure samples). Using various algorithms described herein, the setpoint data and/or position data are processed to detect the presence and degree of stick-slip cycling. If stick-slip cycling is detected, the detected stick-slip cycling is reported to an operator by way of, for example, a user interface and/or one or more recommendations are provided/implemented to correct the detected stick-slip cycling. By detecting stick-slip cycling rather than speculating an existence of a stick-slip by detecting control errors, detecting control system cycling, or detecting control valve instability, a more reliable detection process is provided that also enables an operator to be provided with instructions on how to correct the problem in a timely manner.

With reference now to FIG. 1, a block diagram illustrating an exemplary system 100 for use in performing online diagnostics for a control valve 102 in accordance with the embodiments of the present disclosure will now be described. While system 100 is described herein as being associated with control valve 102, system 100 is applicable with any device or apparatus that performs the functionality illustrated and described herein, or its equivalent. For example, embodiments of the disclosure are operable in detecting stick-slips in numerous other devices with sliding surfaces having a contact friction portion, such as gas governors, drills, and pistons.

System 100 includes a computing device (e.g., without limitation, a controller) 104 that operates in a networked environment using logical connections to one or more other computing devices. Although described in connection with an exemplary computing system environment, embodiments of the present disclosure are operational with numerous other general purpose or special purpose computing system environments or configurations that perform the functionality illustrated and described herein. Examples of well-known computing systems, environments, and/or configurations that are suitable for use with aspects of the present disclosure include, but are not limited to, personal computers, server computers, hand-held or laptop devices, multiprocessor systems, microprocessor-based systems, programmable consumer electronics, mobile telephones, network PCs, minicomputers, mainframe computers, a group of processing units, distributed computing environments that include any of the above systems or devices.

In embodiments, computing device 104 has at least one processor 106 that includes any quantity of processing units, and is programmed to execute computer-executable instructions for implementing aspects of the disclosure. In one embodiment, the instructions are be performed by processor 106, by multiple processors executing within computing device 104, or by a processor external to computing device 104. In embodiments, processor 106 is an integrated circuit (IC), an application specific integrated circuit (ASIC), a microcomputer, a programmable logic controller (PLC), and/or any other programmable circuit. In one embodiment, processor 106 includes multiple processing units (e.g., in a multi-core configuration). In some embodiments, processor 106 is programmed to execute instructions such as those illustrated in FIGS. 2 and 4.

Computing device 104 further has one or more computer readable media, such as memory area 108. Memory area 108 includes any quantity of media associated with or accessible by computing device 104. In one embodiment, memory area 108 is internal to computing device 104 (as shown in FIG. 1), external to computing device 104 (not shown), or both (not shown). Memory area 108 is any device allowing information, such as executable instructions and/or other data, to be stored and retrieved. For example, memory area 108 may store computer readable instructions for detecting a stick-slip and operational measurements including, without limitation, real-time and historical positions of valve stems, directions of travel of the valve stems, friction between the valve stems and packing, setpoint data, threshold level data, pressure data, and/or any other type data. In addition, memory area 108 includes, without limitation, sufficient data, algorithms, and commands to facilitate monitoring and control of the components associated with control valve 102.

In one embodiment, memory device 108 may be remote from computing device 104. In another embodiment, data and the computer-executable instructions may be stored in a cloud service, a database, and/or other memory area accessible by computing device 104. Such embodiments reduce the computational and storage burden on computing device 104.

In some embodiments, computing device 104 includes at least one presentation device 110 for presenting information, such as a user interface, an alarm, and/or recommendations to an operator. Presentation device 110 is any component capable of conveying information to a user. Presentation device 110 may include, without limitation, a display device (e.g., a liquid crystal display (LCD), organic light emitting diode (OLED) display, or "electronic ink" display) and/or an audio output device (e.g., a speaker or headphones). In some embodiments, presentation device 110 includes an output adapter, such as a video adapter and/or an audio adapter. An output adapter is operatively coupled to processor 106 and configured to be operatively coupled to an output device, such as a display device or an audio output device.

In some embodiments, computing device 104 includes an input device 112 for receiving input from a user/operator. Input device 112 may include, for example, a keyboard, a pointing device, a mouse, a stylus, a touch sensitive panel (e.g., a touch pad or a touch screen), a position detector, and/or an audio input device. A single component, such as a touch screen, may function as both an output device of presentation device 110 and input device 112. Computing device 104 also includes a communication interface 114, which is configured to be communicatively coupled to other devices/components, such as a positioner 116, a position sensor 118, and an actuator 120 using, for example, network 122. Network 122 may include, without limitation, the Internet, a local area network (LAN), a wide area network (WAN), a wireless LAN (WLAN), a mesh network, and/or a virtual private network (VPN).

Figure 2:
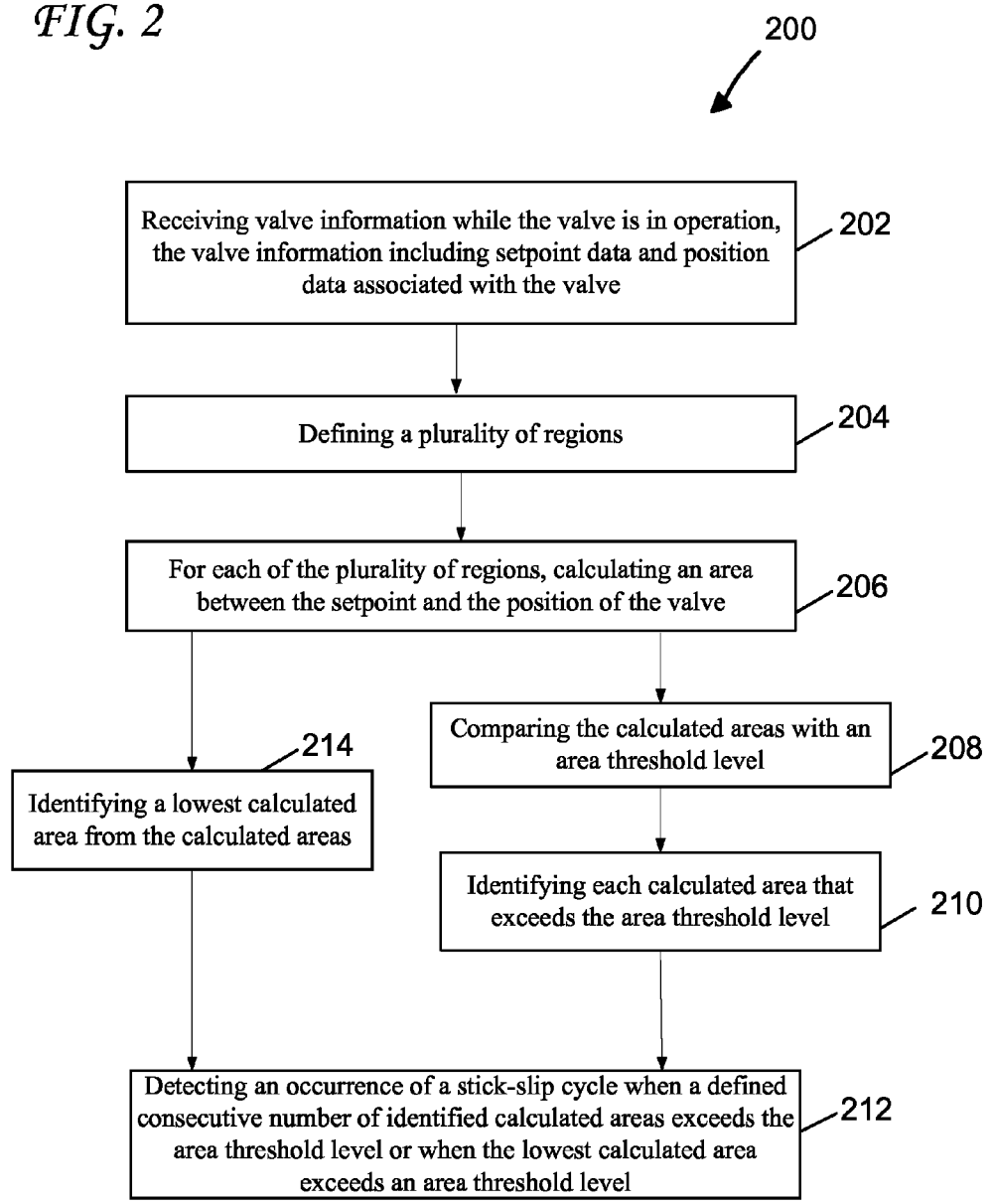
FIG. 2 is a flow chart of an exemplary method for detecting an occurrence of a stick-slip by performing online diagnostics for a valve using the system shown in FIG. 1.

FIG. 2 is an exemplary flow chart 200 that illustrates an operation of computing device 104 (shown in FIG. 1) for performing online diagnostics for control valve 102 (shown in FIG. 1). Computing device 104 receives 202 valve information while control valve 102 is in operation. In one embodiment, the valve information includes setpoint data, position data, and pressure data that is collected over a period time while control valve 102 is being monitored. In one embodiment, the setpoint data and the position data may be received from memory area 108, positioner 116, position sensor 118, and/or actuator 120 (each shown in FIG. 1). In another embodiment, the valve information is automatically: stored in memory area 108, sent to computing device 104, and/or accessed by computing device polling control valve 102 using commands that request the valve information. In one embodiment, about 80 to about 140 samples are collected at a time. In another embodiment, about 100 to about 120 samples are collected at a time.

Figure 3:
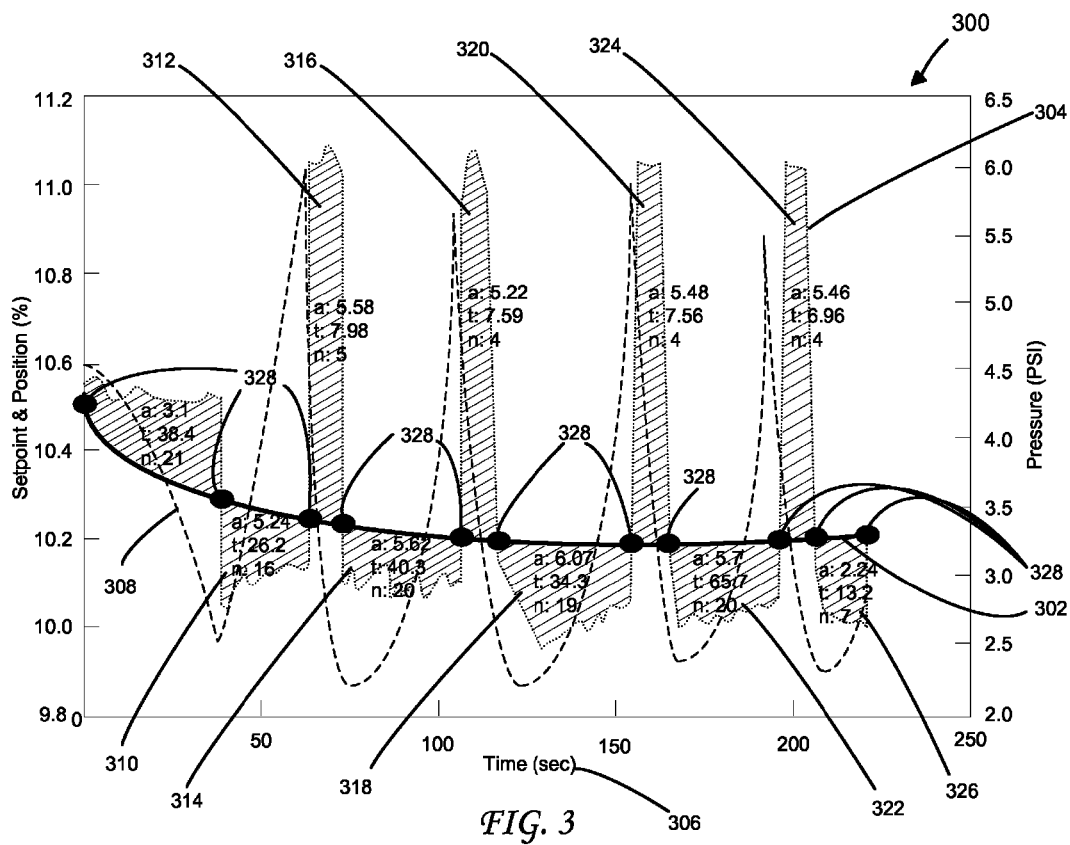
FIG. 3 is an exemplary graph illustrating a segmentation of time into regions using setpoint data and position data used in processing valve information as described herein.

Using a predefined number of setpoint samples and position samples collected over a period of time during an operation of control valve 102, computing device 104 defines 204 a plurality of regions by segmenting time into regions. For example, with reference now to FIG. 3, a graph 300 illustrating a segmentation of time into a plurality of regions using the setpoint data and the position data is shown. More specifically, as shown in FIG. 3, each of setpoint 302 and position 304 are used to segment time 306 into a plurality of regions 308-326. More specifically, using setpoint 302 and position 304, region boundaries are defined by points 328 in time at which setpoint 302 and position 304 cross over each other. Thus, for any of regions 308-326, either a position is greater than a setpoint or a position is less than a setpoint. In one embodiment, regions in which a position is greater than a setpoint are identified as positive error regions (e.g., regions 308, 312, 316, 320, and 324) and regions in which the position is less than a setpoint are identified as negative error regions (e.g., regions 310, 314, 318, 322, and 326). As shown in FIG. 3, the regions created by this exemplary process alternate in time between positive error regions and negative error regions.

Referring back to FIG. 2, computing device 104 (or positioner 116) processes 206 the position data and/or the setpoint data and at a plurality of time intervals. That is, for each segmented region 308-326 (shown in FIG. 3), computing device 104 (or positioner 116) calculates 208 an area between setpoint and/or position of control valve 102. As shown, the horizontal units in graph 300 are time in seconds and the vertical units of graph 300 are in valve position, for example, which is measured in terms of a percent of full valve travel. Thus, the greater a calculated area, the more extreme a position has overshot the setpoint. By comparing the calculated areas to an area threshold level stored in, for example, memory area 108, each calculated area of regions 308-326 that exceeds the area threshold level is identified 210. In the exemplary embodiment shown in FIG. 3, the area threshold level is between a range of from about 2 to about 10 (units of percent-seconds).

With reference back to FIG. 2, computing device 104 (or positioner 116) detects 212 an occurrence of a stick-slip cycle when a defined consecutive number of identified calculated areas exceed the area threshold level. In one embodiment, to detect an occurrence of a stick-slip cycle, the defined consecutive number of identified calculated areas exceeding the area threshold level is 2 consecutive areas to about 8 consecutive areas, and more specifically, about 5 consecutive areas. In another embodiment, the defined number of consecutive areas is a percentage of a total number of areas within a predefined period of time.

In another embodiment, prior to detecting an occurrence of a stick-slip cycle, computing device 104 (or positioner 116) identifies 214 a lowest calculated area from the plurality of calculated areas. In this embodiment, computing device 104 (or positioner 116) detects an occurrence of a stick-slip cycle when the lowest calculated area from the plurality of calculated areas exceeds the area threshold level. In one embodiment, the number of consecutive regions/calculated areas is about 5 and the area threshold level is from about 2.0 to about 10.0 (with units of percent-seconds). To illustrate this further, in the following example, areas are calculated for 10 regions over a 220 second interval. For these 10 regions, there are 6 groups of N=5 consecutive regions (e.g., 1 to 5, 2 to 6, . . . , 6 to 10). If any of these groups has a group metric (e.g., a lowest calculated area) greater than the area threshold level, this is an indicator that stick-slip has occurred.

In another embodiment, a stick-slip metric can be computed for any time interval. For example, over the entire signal under consideration in the example above, for all the groups within the 10 calculated regions, a maximum calculated area is identified. If the maximum calculated area is greater than the area threshold level, a flag/warning is provided to a user indicating that stick-slip/or a probability of a stick-slip has occurred.

In one embodiment, the processing to determine group metrics or a stick-slip metric can be done in batch mode (as described above) or in a continuous fashion by buffering the data. For example, in one embodiment, for continuous operation, incoming setpoint and position data (e.g., samples) are placed in a buffer. When the setpoint and position cross to create a region and an area of the region is computed, data on the buffer from before the time of the crossing point may then be discarded. When a region is formed and its calculated area is placed on an area buffer, a group metric (e.g., lowest calculated area or highest calculated area) can be computed from the areas in the area buffer. This group metric is then compared to the area threshold level and/or may be stored in, for example, memory area 108. In one embodiment, continuous data is processed and/or stored continuously in this manner.

In one embodiment, to reduce the number false indications of stick-slip detection, one or more of the following are confirmed/determined prior to detecting a stick slip: shutoff cycling is not detected; if tight shutoff is enabled, a position of the valve exceeds a position threshold; if a tight shutoff is enabled, a setpoint of the valve exceeds a setpoint threshold; and an unexpected movement in a position of the valve is detected.

In one embodiment, as a result of stick-slip detection, an alarm is presented to an operator using, for example, presentation device 110 (shown in FIG. 1). That alarm can be audible or visual, such as a flag or color coded text. Further, once a stick-slip is detected, computing device 104 provides the operator with recommendations and/or automatically implements one or more of the recommendations based on the detected stick-slip. For example, an operator is presented with one or more of the following recommendations: adjust a valve packing, apply a packing lubricant to a valve packing, replace the valve packing, replace a stem of a control valve, and/or adjust the control algorithm in the valve controller or a process controller. Thus, upon detection of a stick-slip, computing device 104 provides (to a user) or implements one or more of these recommendations.

Figure 4:
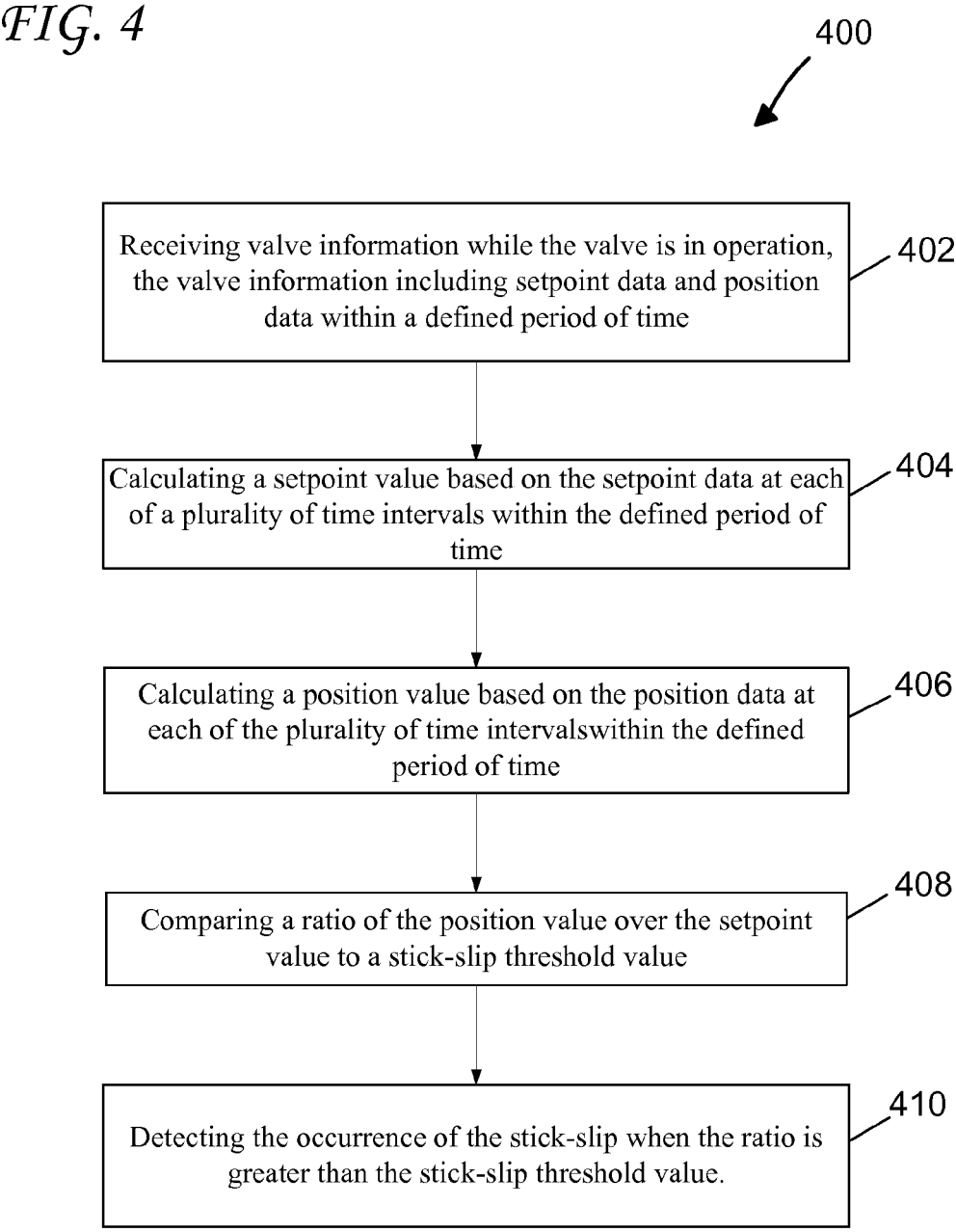
FIG. 4 is a flow chart of an exemplary method for detecting an occurrence of a stick-slip by performing online diagnostics for a valve using the system shown in FIG. 1.

FIG. 4 is an exemplary flow chart 400 that illustrates an additional operation of computing device 104 (shown in FIG. 1) for performing online diagnostics for control valve 102 (shown in FIG. 1). One of the difficulties of detecting stick-slip is that sudden movements of a control valve (e.g., control valve 102) can also be in response to sudden movements of the setpoint. Because of lags in a system, it is often difficult to associate valve movements directly with setpoint movements. The method described below with respect to FIG. 4 enables stick-slip to be detected by looking for the position to make larger "steps" than the setpoint. This is accomplished by calculating a measure that weights large movements heavily over small movements, whereby stick-slip is inferred when this measure for the position is much greater than for the setpoint.

Referring back to FIG. 4, computing device 104 receives 402 valve information while control valve 102 is in operation. In one embodiment, the valve information includes setpoint data, position data, and/or pressure data that is collected over a period time (e.g., a time it takes to collected a defined number of samples of setpoint, position, and/or pressure data) while control valve 102 is being monitored. In one embodiment, the setpoint data and the position data may be received from memory area 108, positioner 116, position sensor 118, and/or actuator 122 (each shown in FIG. 1). In another embodiment, the valve information is automatically: stored in memory area 108, sent to computing device 104, and/or accessed by polling control valve 102 using commands that request the valve information. In one embodiment, about 80 to about 140 samples are collected at a time. In another embodiment, about 100 to about 120 samples are collected at a time.

Using the setpoint data and the position data collected during operation of control valve 102 over a period of time (e.g., an amount of time it takes to collect a number of setpoint and position samples), computing device 104 (or positioner 116) calculates 404 a setpoint value based on the setpoint data at each of a plurality of time intervals within the period of time, and calculates 406 a position value based on the position data at each of the plurality of time intervals within the period of time. In one embodiment, the setpoint value is a p-norm of a first difference of setpoint and the position value is a p-norm of a first difference of position. Computing device 104 (or positioner 116) compares a ratio of the position value over the setpoint value to a stick-slip threshold value. Thereafter, computing device 104 (or positioner 116) detects 410 an occurrence of a stick-slip when the ratio of the position value over the setpoint value is greater than a stick-slip threshold value.

More specifically, using Equation (1) set forth below, a p-norm of a first difference of setpoint (e.g., RSp) is calculated, where "N" is a number of points and "p" is an algorithm parameter between, for example, 2.0 and 6.0, and ΔSP is the difference between each setpoint.

$$RSp = \sqrt[p]{\frac{|\Delta SP|^p}{N}} \qquad \text{Equation (1)}$$

Further, using Equation (2) set forth below, a p-norm of a first difference of position (e.g., RPos) is calculated, where "N" is a number of points and "p" is an algorithm parameter between, for example, 2.0 and 6.0, and ΔPos is the difference between each position.

$$RPos = \sqrt[p]{\frac{|\Delta Pos|^p}{N}} \qquad \text{Equation (2)}$$

The metric (metric=RPos/Rsp) is then calculated by taking the ratio of RPos over Rsp. The value of the calculated metric is then compared to a stick-slip threshold. In one embodiment, the stick-shift threshold value is between 1 and 3. If the metric is greater than the stick-shift threshold, a stick-slip is detected and computing device 104 provides the operator with recommendations and/or automatically implements one or more of the recommendations based on the detected stick-slip.

In one embodiment position data, setpoint data, and/or pressure data collected is limited to data that falls within a defined range. For example, a position, setpoint, and/or pressure is collected if the data is between 5% to 95%. Data that falls outside this range represents a data point that is an outlier, and thus, not used. In another embodiment, position data, setpoint data, and/or pressure data collected is limited to data that falls within a particular portion of an operating range of a control valve. For example, a position, setpoint, and/or pressure is collected if the data is between 50% to 70%. Data that falls outside this range represents a data point that is a part of the portion of interest of the operation range of the control valve.

Figure 5:
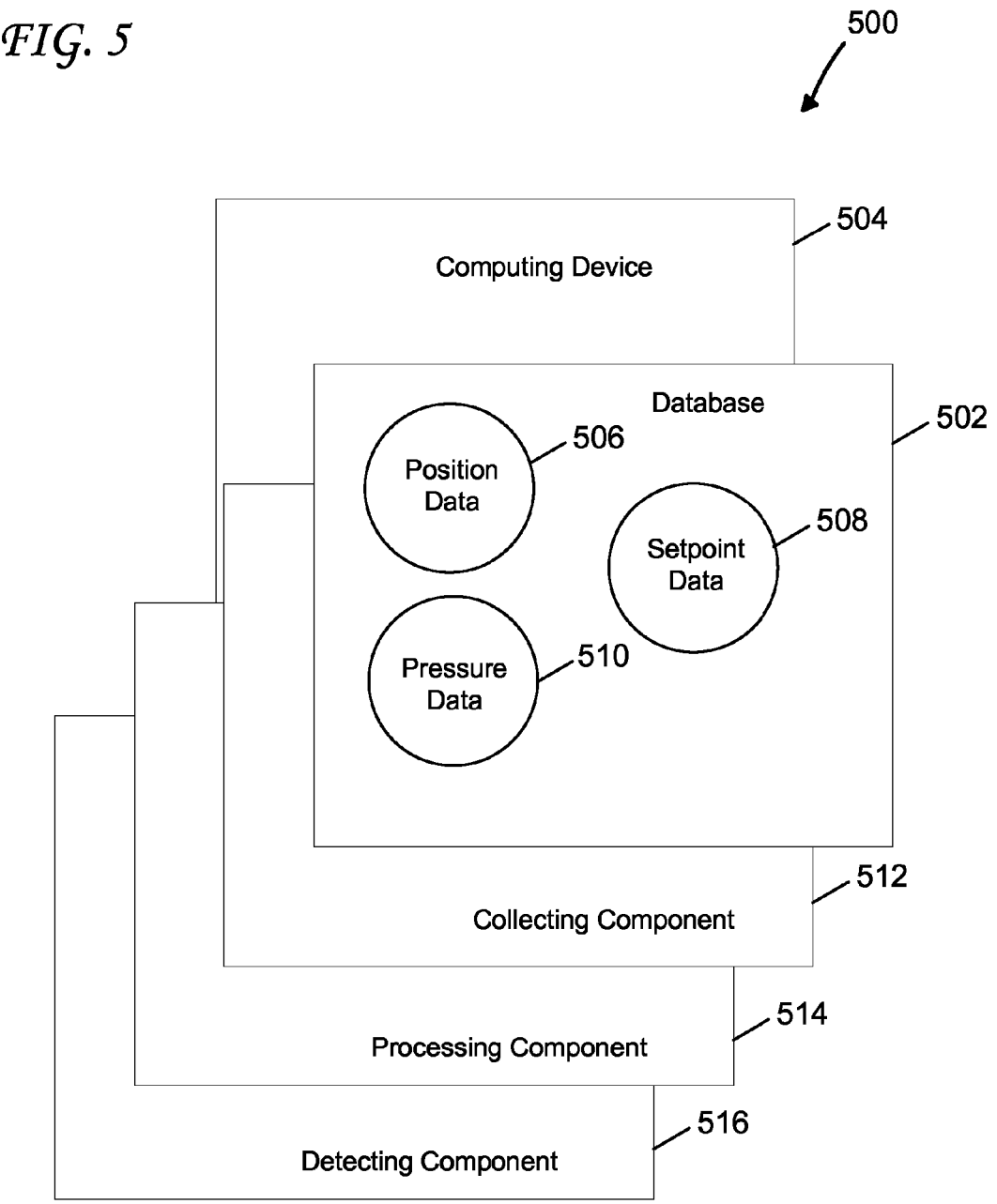
FIG. 5 illustrates an exemplary configuration of a database within a computing device, along with other related computing components, that may be used for detecting an occurrence of a stick-slip as described herein.

FIG. 5 illustrates an exemplary configuration 500 of a database 502 (e.g., memory 108 shown in FIG. 1) within a computing device 504 (e.g., computing device 104 shown in FIG. 1), along with other related computing components, that may be used during detecting an occurrence of a stick-slip as described herein. Database 502 is coupled to several separate components within computing device 504, which perform specific tasks.

In the exemplary embodiment, Computing device 504 includes database 502 (which includes position data 506, setpoint data 508, and/or pressure data 510). A collecting component 512 is also included for collecting position data 506, setpoint data 508, and/or pressure data 510. Moreover, computing device 504 includes a processing component 514 for processing the collected data, and a detecting component 516 detecting an occurrence of a stick-slip based on the processing.

The embodiments described above enable valve information (e.g., setpoint data and position data) to be collected during operation the control valve to detect stick-slip cycling in the control valve. Control valve information, such as setpoints of the control valve, positions of the control valve, and even pressure applied to the control valve are collected at a plurality of time intervals over a defined period of time or for a defined number of samples during an operation of the control valve. Using the various algorithms described above, the setpoint data and position data are processed to detect the presence and degree of stick-slip cycling. If stick-slip cycling is detected, the detected stick-slip cycling is reported to an operator and/or one or more recommendations are provided/implemented to correct the detected stick-slip cycling.

An exemplary technical effect of the methods, systems, and apparatus described herein includes at least one of: (a) accurately detecting stick slip; (b) detecting stick slip using data collected during an operation of a control valve; (c) providing recommendations/warnings to an operator upon detecting a stick-slip; and (d) implementing methods (e.g., one or more of the recommendations) to correct the stick-slip.

Exemplary embodiments of systems and methods for detecting stick-slip are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring stick-slip detection systems and methods, and are not limited to practice with only the system methods as described herein. Rather, the exemplary embodiments can be implemented and utilized in connection with many other systems and methods.

Although specific features of various embodiments may be shown in some drawings and not in others, this is for convenience only. In accordance with the principles of the systems and methods described herein, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of performing online diagnostics for a valve, said method comprising:
   receiving valve information while the valve is in operation, the valve information including setpoint data and position data associated with the valve;
   defining a plurality of regions, wherein each region is defined by points in time at which a setpoint of the valve intersects a position of the valve;
   calculating, for each of the plurality of regions, an area between the setpoint and the position of the valve;
   processing the setpoint data by calculating a setpoint value based on the setpoint data at each of the plurality of time intervals, wherein the setpoint value is based on a p-norm of a first difference of setpoint;
   processing the position data at a plurality of time intervals by calculating a position value based on the position data at each of the plurality of time intervals, wherein the position value is based on a p-norm of a first difference of position; and
   detecting an occurrence of a stick-slip based on the processing.

2. The method of claim 1, wherein:
   processing the setpoint data and the position data at the plurality of time intervals comprises:
   comparing the calculated areas with an area threshold level; and
   identifying each calculated area that exceeds the area threshold level; and
   detecting the occurrence of the stick-slip based on the processing comprises detecting an occurrence of a stick-slip cycle when a defined consecutive number of identified calculated areas exceeds the area threshold level.

3. The method of claim 1, wherein:
   processing the setpoint data and the position data at the plurality of time intervals comprises:
   identifying a lowest calculated area from the calculated areas; and
   detecting the occurrence of the stick-slip based on the processing comprises detecting the occurrence of the stick-slip when the lowest calculated area exceeds an area threshold level.

4. The method of claim 1 further comprising, prior to detecting an occurrence of the stick-slip, determining at least one of the following:
   shutoff cycling is not detected;
   if tight shutoff is enabled, the position of the valve exceeds a position threshold;
   if a tight shutoff is enabled, the setpoint of the valve exceeds a setpoint threshold; and
   an unexpected movement in the position of the valve is detected.

5. The method of claim 1 further comprising providing a recommendation to correct the stick-slip, wherein the recommendation comprises one or more of the following:
   adjusting a valve packing;
   applying a packing lubricant to the valve packing;
   replacing the valve packing; and
   replacing a stem of the valve.

6. The method of claim 1, wherein:
   detecting the occurrence of the stick-slip based on the processing comprises:
      comparing a ratio of the position value over the setpoint value to a stick-slip threshold value; and
      detecting the occurrence of the stick-slip when the ratio is greater than the stick-slip threshold value.

7. A system for performing online diagnostics for a valve, said system comprising:
   a process controller generating a plurality of setpoints for operating the valve through a series of gradual movements;
   a positioner component receiving the plurality of setpoints and generating a signal for positioning the valve based on the plurality of setpoints; and
   a processor programmed to:
   receive valve information from the positioner component, the valve information including setpoint data and position data associated with the valve;
   define a plurality of regions, wherein each region is defined by points in time at which a setpoint of the valve intersects a position of the valve;
   calculate, for each of the plurality of regions, an area between the setpoint and the position of the valve;
   process the setpoint data by calculating a setpoint value based on the setpoint data at each of the plurality of time intervals, wherein the setpoint value is based on a p-norm of a first difference of setpoint;
   process the position data at a plurality of time intervals by calculating a position value based on the position data at each of the plurality of time intervals, wherein the position value is based on a p-norm of a first difference of position; and
   detect an occurrence of a stick-slip based on the processing.

8. The system of claim 7, wherein:
   processing the setpoint data and the position data at the plurality of time intervals comprises:
   comparing the calculated areas with an area threshold level; and
   identifying each calculated area that exceeds the area threshold level; and
   detecting the occurrence of the stick-slip based on the processing comprises detecting an occurrence of a stick-slip cycle when a defined consecutive number of identified calculated areas exceeds the area threshold level.

9. The system of claim 7, wherein:
   processing the setpoint data and the position data at the plurality of time intervals comprises:
      identifying a lowest calculated area from the calculated areas; and
      detecting the occurrence of the stick-slip based on the processing comprises detecting the occurrence of the stick-slip when the lowest calculated area exceeds an area threshold level.

10. The system of claim 7, wherein the processor is further programmed to, prior to detecting an occurrence of the stick-slip, determine at least one of the following:
   shutoff cycling is not detected;
   if tight shutoff is enabled, the position of the valve exceeds a position threshold;
   if a tight shutoff is enabled, the setpoint of the valve exceeds a setpoint threshold; and
   an unexpected movement in a position of the valve is detected.

11. The system of claim 7, wherein the processor is further programmed to provide a recommendation to correct the stick-slip, wherein the recommendation comprises one or more of the following:
   adjusting a valve packing;
   applying a packing lubricant to the valve packing;
   replacing the valve packing; and
   replacing a stem of the valve.

12. The system of claim 7, wherein:
   detecting the occurrence of the stick-slip based on the processing comprises:
   comparing a ratio of the position value over the setpoint value to a stick-slip threshold value; and
   detecting the occurrence of the stick-slip when the ratio is greater than the stick-slip threshold value.

13. One or more non-transitory computer-readable media comprising computer-executable instructions for performing online diagnostics for a valve, the computer-executable instructions causing at least one processor to:
   receive valve information while the valve is in operation, the valve information including setpoint data and position data associated with the valve;
   process the setpoint data and the position data at a plurality of time intervals by:
   calculating a setpoint value based on the setpoint data at each of a plurality of time intervals, wherein the setpoint value is based on a p-norm of a first difference of setpoint; and
   calculating a position value based on the position data at each of the plurality of time intervals, wherein the position value is based on a p-norm of a first difference of position; and
   detect an occurrence of a stick-slip based on the processing.

14. The non-transitory computer-readable media of claim 13, wherein the computer-executable instructions further cause the at least one processor to define a plurality of regions, wherein:
   each region is defined by points in time at which a setpoint of the valve intersects a position of the valve;
   processing the setpoint data and the position data at the plurality of time intervals comprises:
      for each of the plurality of regions, calculating an area between the setpoint and the position of the valve;
      comparing the calculated areas with an area threshold level; and
      identifying each calculated area that exceeds the area threshold level; and
   detecting the occurrence of the stick-slip based on the processing comprises detecting an occurrence of a stick-slip cycle when a defined consecutive number of identified calculated areas exceeds the area threshold level.

15. The non-transitory computer-readable media of claim 13, wherein the computer-executable instructions further cause the at least one processor to define a plurality of regions, wherein:
   each region is defined by points in time at which a setpoint of the valve intersects a position of the valve; and
   processing the setpoint data and the position data at the plurality of time intervals comprises:
      for each of the plurality of regions, calculating an area between the setpoint and the position of the valve;
      identifying a lowest calculated area from the calculated areas; and detecting the occurrence of the stick-slip based on the processing comprises detecting an occurrence of the stick-slip when the lowest calculated area exceeds an area threshold level.

16. The non-transitory computer-readable media of claim 13, wherein the computer-executable instructions further cause the at least one processor to provide a recommendation to correct the stick-slip, wherein the recommendation comprises one or more of the following:
   adjusting a valve packing;
   applying a packing lubricant to the valve packing;
   replacing the valve packing; and
   replacing a stem of the valve.

17. The non-transitory computer-readable media of claim 13, wherein:
   detecting the occurrence of the stick-slip based on the processing comprises:
   comparing a ratio of the position value over the setpoint value to a stick-slip threshold value; and
   detecting the occurrence of the stick-slip when the ratio is greater than the stick-slip threshold value.

* * * * *